United States Patent
Kano

(10) Patent No.: US 10,180,898 B2
(45) Date of Patent: Jan. 15, 2019

(54) TEST DEVICE, NETWORK SYSTEM, AND TEST METHOD

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 15/392,447

(22) Filed: Dec. 28, 2016

(65) Prior Publication Data
US 2017/0220454 A1 Aug. 3, 2017

(30) Foreign Application Priority Data
Jan. 29, 2016 (JP) ................................ 2016-016039

(51) Int. Cl.
  *G06F 9/46* (2006.01)
  *G06F 11/36* (2006.01)
  *G06F 9/455* (2018.01)

(52) U.S. Cl.
  CPC ...... *G06F 11/3668* (2013.01); *G06F 9/45558* (2013.01); *G06F 11/3664* (2013.01); *G06F 2009/45562* (2013.01); *G06F 2009/45575* (2013.01); *G06F 2009/45591* (2013.01)

(58) Field of Classification Search
  CPC ............. G06F 11/3668; G06F 9/45558; G06F 11/3664; G06F 2009/45562; G06F 2009/45575; G06F 2009/45591
  See application file for complete search history.

(56) References Cited

U.S. PATENT DOCUMENTS

| | | | |
|---|---|---|---|
| 9,372,731 B1 * | 6/2016 | Marr | G06F 9/5077 |
| 9,792,187 B2 * | 10/2017 | Mutalik | G06F 11/1484 |
| 2009/0172660 A1 * | 7/2009 | Klotz, Jr. | G06F 9/5077 718/1 |
| 2009/0217244 A1 * | 8/2009 | Bozak | G06F 8/65 717/124 |
| 2015/0229540 A1 | 8/2015 | Wang et al. | |

FOREIGN PATENT DOCUMENTS

| | | |
|---|---|---|
| JP | 2002-182944 | 6/2002 |
| JP | 2005-301438 | 10/2005 |
| JP | 2015-529429 | 10/2015 |

* cited by examiner

*Primary Examiner* — Camquy Truong
(74) *Attorney, Agent, or Firm* — Staas & Halsey LLP

(57) ABSTRACT

A test device includes a memory and a processor coupled to the memory. The processor is configured to execute a test on a first virtual machine among a plurality of virtual machines included in a network in operation. The processor is configured to generate a first snapshot of the first virtual machine before the test is executed. The processor is configured to generate a first substitute machine from the first snapshot. The first substitute machine is a substitute for the first virtual machine. The processor is configured to determine whether the test results in success. The processor is configured to replace the first virtual machine with the first substitute machine depending on a result of the determination.

9 Claims, 12 Drawing Sheets

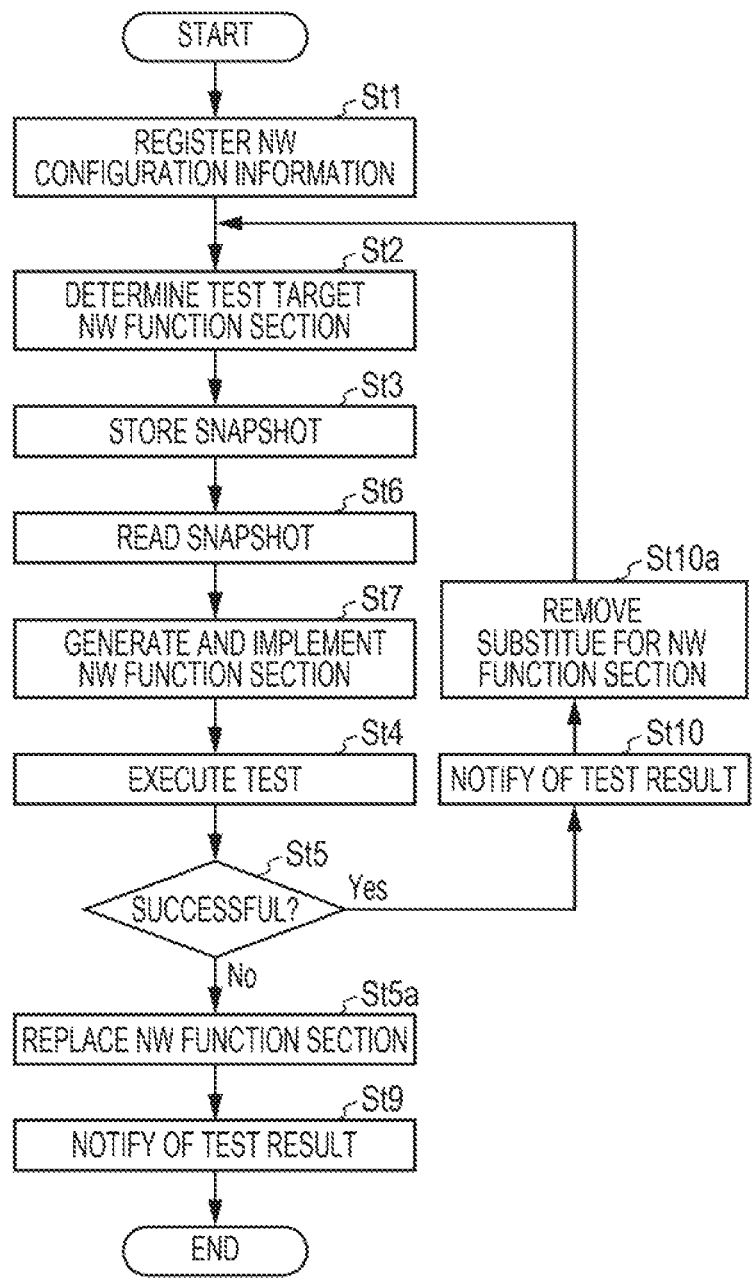

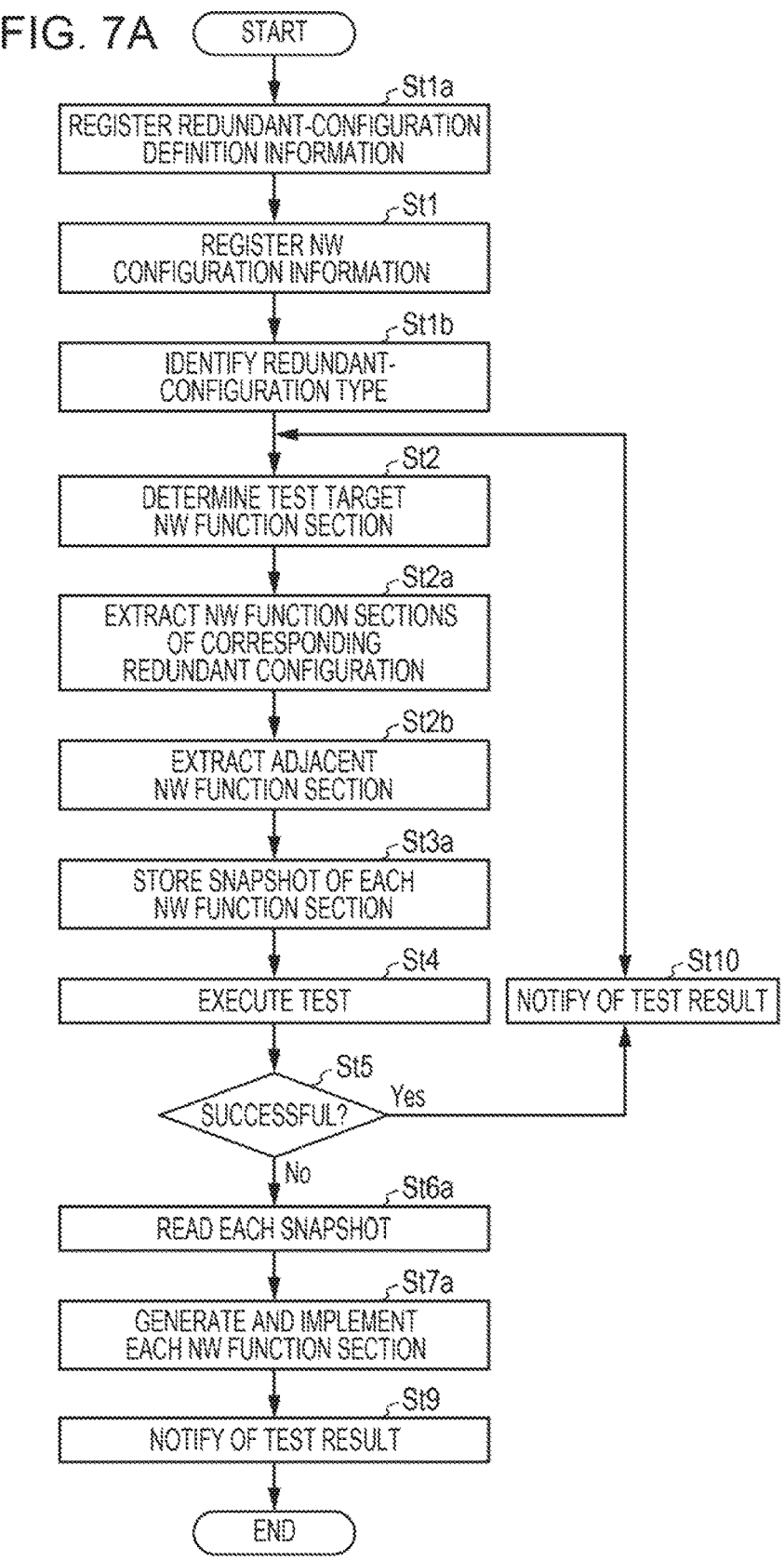

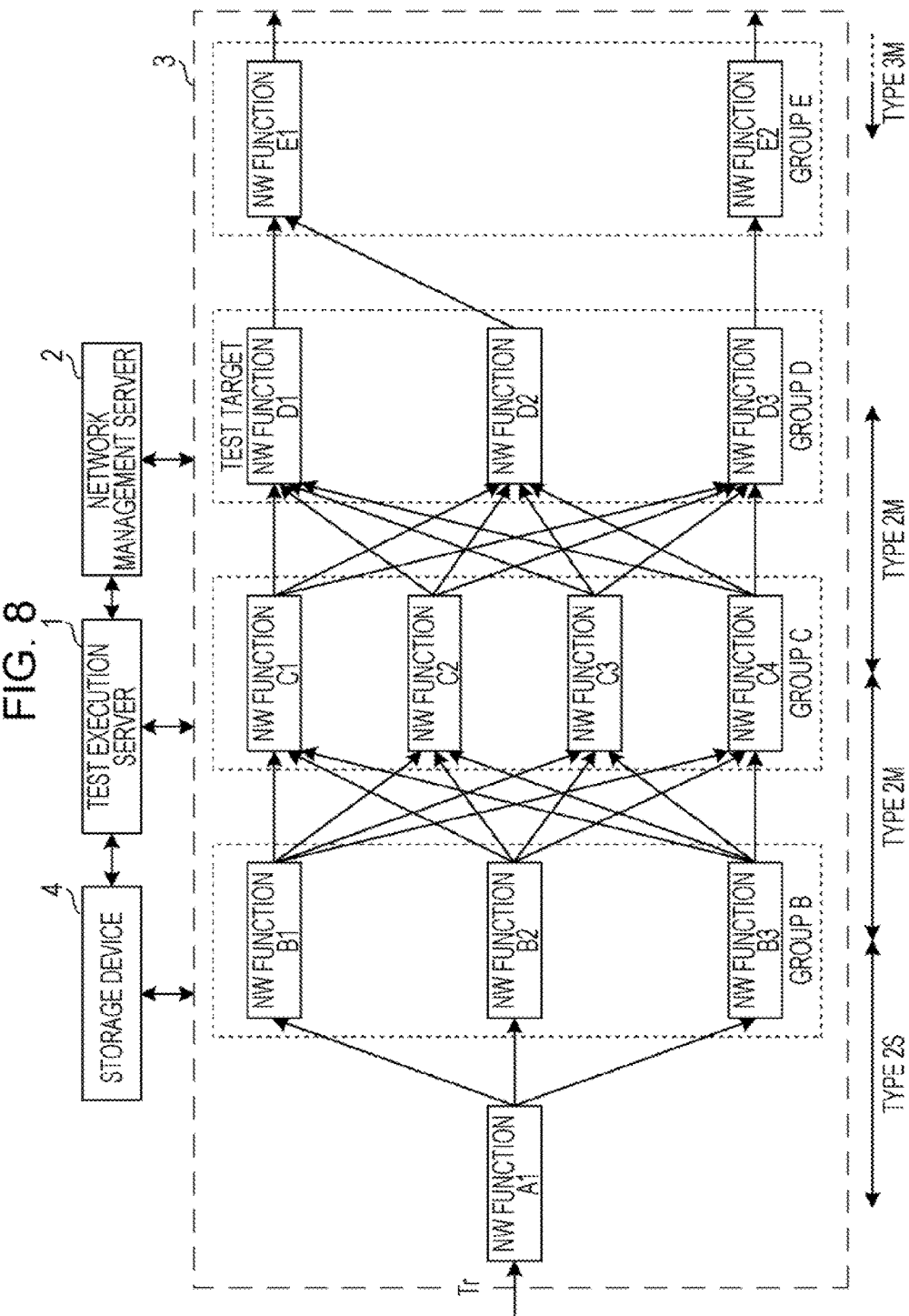

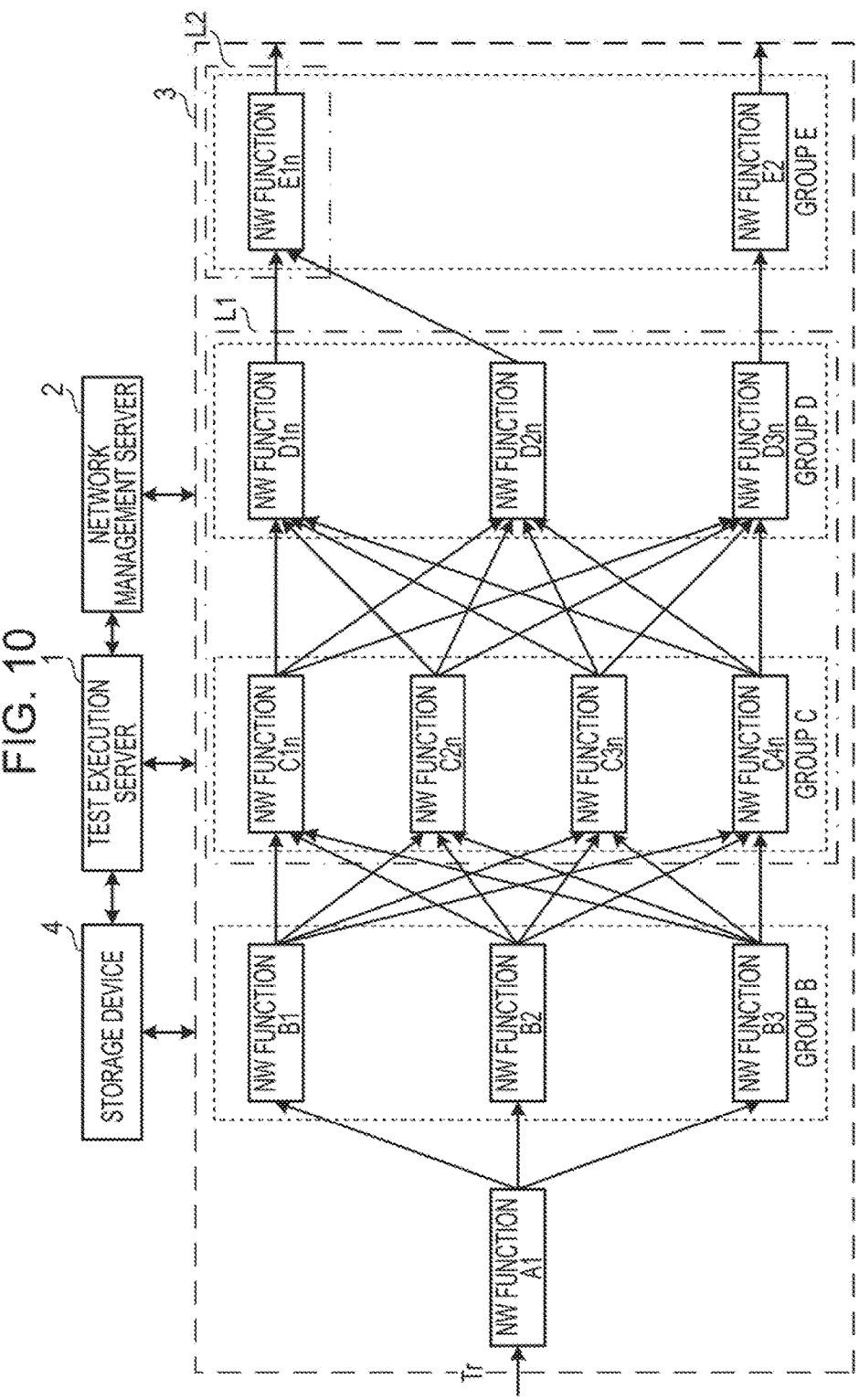

TEST DEVICE, NETWORK SYSTEM, AND TEST METHOD

CROSS-REFERENCE TO RELATED APPLICATION

This application is based upon and claims the benefit of priority of the prior Japanese Patent Application No. 2016-016039, filed on Jan. 29, 2016, the entire contents of which are incorporated herein by reference.

FIELD

The embodiment discussed herein is related to a test device, a network system, and a test method.

BACKGROUND

For example, with the spread of server virtualization technology and network virtualization technology, networks have been complicated. Server virtualization technology is a technology in which a plurality of computers are virtually formed in a single server and an individual operating system (OS) and applications are implemented in each computer. Network virtualization technology is a technology in which various network functions are virtually formed in a server or the like using applications.

Furthermore, in addition to the above-described virtual machine (VM), for example, use of open source software (OSS), linkage between new and old systems, or the like, is desired to be employed, networks are even more complicated. When a network is complicated, a potential problem might arise while the network is in operation and influence a communication service that is being provided on the network.

In contrast, software that executes, for example, an automatic test of inputting test traffic, causing an occurrence of a pseudo failure, or the like on a network in operation has been studied and developed. Examples of such software include, for example, a product of open source software "Chaos Monkey", for which Netflix (registered trademark) Inc. plays a central role in the development. Using "Chaos Monkey", a virtual machine that is a test target is selected at random from a registered virtual machine group on a cloud, stop of the virtual machine or the like is forcibly executed, and the performance of restoration from a failure may be tested.

Related techniques are disclosed in, for example, Japanese Laid-open Patent Publication No. 2002-182944 and Japanese Laid-open Patent Publication No. 2005-301438.

When a test is executed on a network in operation, reduction in the quality of a communication service that is being provided on the network due to the occurrence of the above-described problem is a concern. For example, in a network that is in operation, assuming that there are three virtual firewalls between which a load is distributed by a virtual load balancer, when a test in which a pseudo failure is caused to occur in one of the virtual firewalls is performed, as long as load distribution processing is normally performed, the other two of the virtual firewalls are operated in a fallback mode and traffic processing of the virtual firewall in which the failure occurs is distributed to the other two virtual firewalls.

If an error occurs in load distribution processing, the load of traffic processing is not distributed to the other two virtual firewalls, and traffic may be discarded. That is, the entire traffic processing performance of the virtual firewalls may be reduced to about two thirds. Furthermore, in a worse case, it is conceivable that load distribution processing itself of the virtual load balancer may be stopped and traffic processing of the other two virtual firewalls may be stopped.

SUMMARY

According to an aspect of the present invention, provided is a test device including a memory and a processor coupled to the memory. The processor is configured to execute a test on a first virtual machine among a plurality of virtual machines included in a network in operation. The processor is configured to generate a first snapshot of the first virtual machine before the test is executed. The processor is configured to generate a first substitute machine from the first snapshot. The first substitute machine is a substitute for the first virtual machine. The processor is configured to determine whether the test results in success. The processor is configured to replace the first virtual machine with the first substitute machine depending on a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5B is a flowchart illustrating an example of processing of a test execution server;

FIG. 7A is a flowchart illustrating an example of processing of a test execution server;

FIG. 8 is a diagram illustrating exemplary identification of redundant-configuration types;

FIG. 10 is a diagram illustrating an example of replacement processing of replacing a network function section.

DESCRIPTION OF EMBODIMENT

Figure 1:
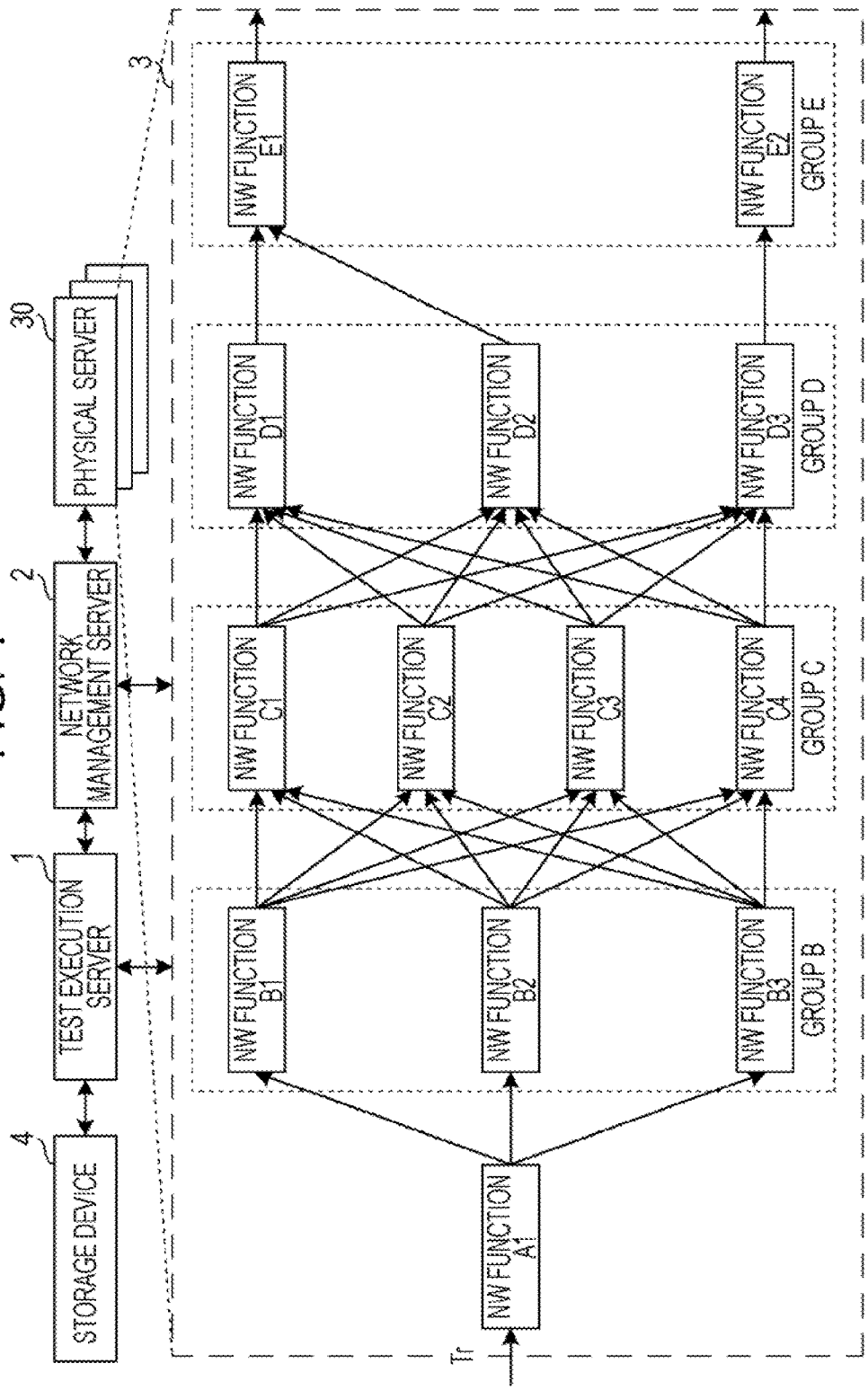
FIG. 1 is a diagram illustrating an exemplary configuration of a network system.

FIG. 1 is a diagram illustrating an exemplary configuration of a network system. The network system includes a test execution server 1 that is an example of a test device, a network management server 2, a storage device 4 that stores therein information, and a plurality of physical servers 30 in which a network 3 is virtually formed. The network 3 includes various network function sections (NW functions)

A1, B1 to B3, C1 to C4, D1 to D3, E1, and E2 that are coupled to each other. The network 3 may be formed by a single physical server 30.

The plurality of physical servers 30 execute a predetermined application, and thereby, form, for example, as virtual machines, the NW function sections A1, B1 to B3, C1 to C4, D1 to D3, E1, and E2. The NW function sections A1, B1 to B3, C1 to C4, D1 to D3, E1, and E2 function as virtual communication devices.

The NW function sections B1 to B3, C1 to C4, D1 to D3, E1, and E2 are divided into groups B to E. The NW function sections B1 to B3 belong to the group B, the NW function sections C1 to C4 belong to the group C, and the NW function sections D1 to D3 belong to the group D, and the NW function sections E1 and E2 belong to the group E.

Traffic Tr of a communication is transferred via the NW function section A1, the group B, the group C, the group D, and the group E in this order (see arrows in the network 3). The NW function sections B1 to B3, C1 to C4, D1 to D3, E1, and E2 execute functions of, for example, a firewall, a proxy server, a load balancer, or the like for each of the groups B to E on the input traffic Tr. Similarly, the NW function section A1 also executes a predetermined function.

Between the groups B to E, the NW function sections B1 to B3, C1 to C4, D1 to D3, E1, and E2 operate in individual redundant configuration forms. Each redundant configuration form is defined by a "type" that will be described later.

The network management server 2 manages the network 3. The network management server 2 performs management of connection configurations and redundant configurations of the NW function sections A1, B1 to B3, C1 to C4, D1 to D3, E1, and E2, paths of the traffic Tr, a processing performance of the traffic Tr, and resources, and the like.

The test execution server 1 executes a predetermined test on the network 3 in operation. Thus, a potential problem that exists in the network 3 may be detected and solved. However, reduction in the quality (which will be hereinafter referred to as "service quality") of a communication service, which is being provided on the network, due to the occurrence of the above-described problem is a concern.

A case where the NW function section A1 is a virtual load balancer and the NW function sections B1 to B3 are virtual firewalls will be described as an example. In this case, the NW function section A1 distributes the load of processing of the traffic Tr to the NW function sections B1 to B3.

Therefore, when the test execution server 1 performs a test in which a pseudo failure is caused to occur in the NW function section B1, as long as load distribution processing of the NW function section A1 is normally performed, traffic processing of the NW function section B1 in which a failure is occurred is distributed to the other NW function sections B2 and B3.

However, if an error occurs in load distribution processing of the NW function section A1, the traffic processing is not distributed to the NW function sections B2 and B3, and a part of traffic is not relayed but discarded. Furthermore, in a worse case, it is conceivable that load distribution processing itself of the NW function section A1 is stopped and traffic processing of the NW function sections B2 and B3 is also stopped.

Therefore, the test execution server 1 stores, before a test is executed, a snapshot of the NW function section B1, which is a target of the failure occurrence in the network 3, and generates, depending on whether or not the test results in success, a substitute NW function section from the snapshot, thereby reducing the influence of the test on the service quality.

A snapshot herein is a virtual disk image stored in a storage as a system state of a virtual machine at a specific point in time, data written by the virtual machine during its implementation on a memory as a system state of the virtual machine at the specific point in time, and a file in which the system configuration information of the virtual machine is stored as a system state of the virtual machine at the specific point in time, and the like.

More specifically, in advance of the execution of the test, the test execution server 1 generates a snapshot of a test target NW function section among the NW function sections A1, B1 to B3, C1 to C4, D1 to D3, E1 and E2 and stores the snapshot in the storage device 4 including a storage, such as a hard disk drive (HDD), a memory, or the like. The storage destination of the snapshot is not limited to the storage device 4 and may be a storage, such as an HDD, a memory, or the like, which is provided in the test execution server 1.

The test execution server 1 executes the test on the test target NW function section among the NW function sections A1, B1 to B3, C1 to C4, D1 to D3, E1, and E2, and determines whether or not the test results in success. Examples of the test executed on the network 3 include, for example, a test in which a pseudo failure is caused to occur in one of the NW function sections A1, B1 to B3, C1 to C4, D1 to D3, E1, and E2 and a test in which test traffic is input to one of the NW function sections A1, B1 to B3, C1 to C4, D1 to D3, E1, and E2.

As a result of the determination, if it is determined that the test results in failure, that is, if the network 3 performs an error operation that influences the service quality (an error or a problem occurs), the test execution server 1 generates a new NW function section that is a substitute for the test target NW function section among the NW function sections A1, B1 to B3, C1 to C4, D1 to D3, E1, and E2 from the stored snapshot on the relevant physical server 30. Then, the test execution server 1 replaces, in the network 3, the test target NW function section among the NW function sections A1, B1 to B3, C1 to C4, D1 to D3, E1, and E2 with the new NW function section.

The test execution server 1 implements the new NW function section, and thereby, restarts an operation of the test target NW function section among the NW function sections A1, B1 to B3, C1 to C4, D1 to D3, E1, and E2 from the state thereof at the point in time at which the snapshot is generated. Thus, the test execution server 1 may restore the test target NW function section among the NW function sections A1, B1 to B3, C1 to C4, D1 to D3, E1, and E2 to the state thereof before the execution of the test.

Therefore, even when a potential problem occurs due to the execution of the test on the network 3, the test execution server 1 may reduce the influence of the test on the service quality. Note that, as will be described later, the snapshot may not be generated only for the test target NW function section but may also be generated for the other NW function sections in the redundant configuration including the test target NW function section and other NW function sections located adjacent to the NW function sections.

Figure 2:
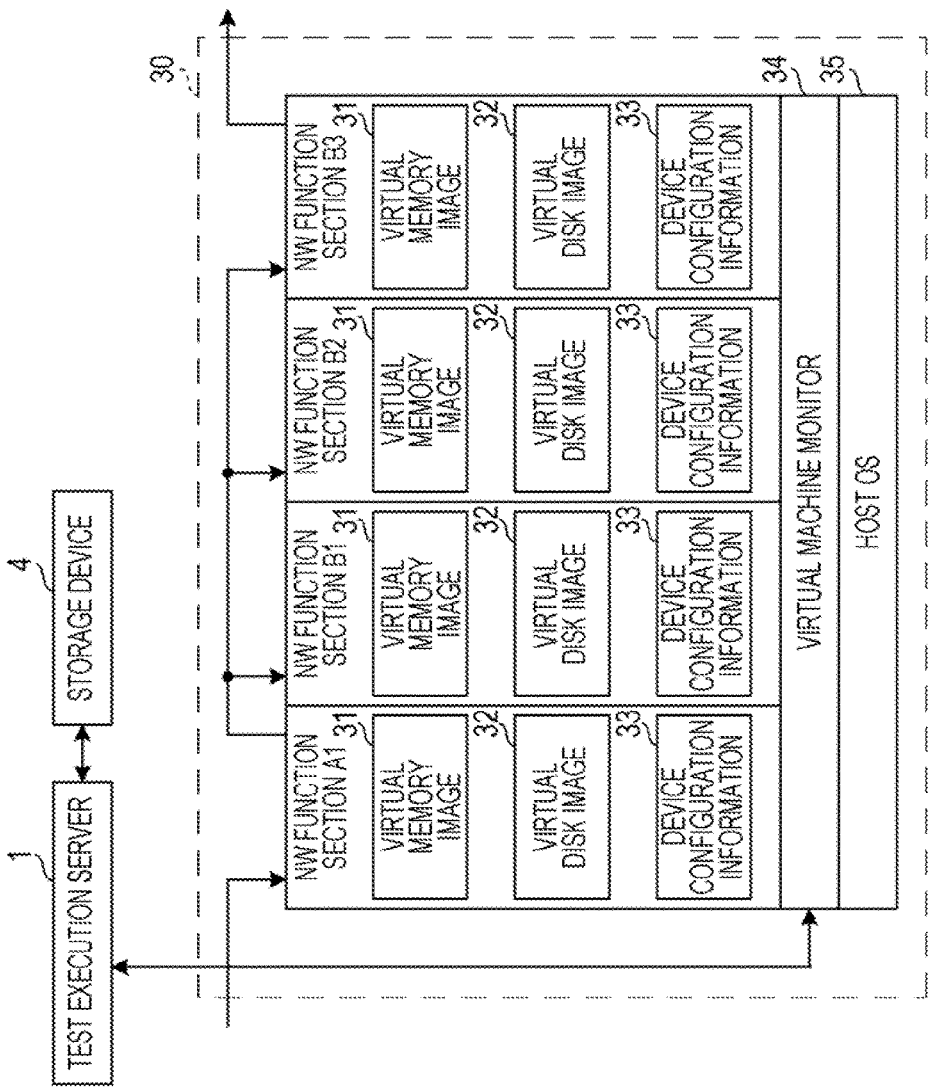
FIG. 2 is a diagram illustrating an exemplary configuration of network function sections.

FIG. 2 is a configuration diagram illustrating an exemplary configuration of network function sections A1 and B1 to B3. As an example, the NW function sections A1 and B1 to B3 are formed in the common physical server 30. Note that, although not illustrated, similar to the NW function sections A1 and B1 to B3, the other NW function sections C1 to C4, D1 to D3, E1, and E2 are also formed in another physical server 30.

The NW function sections A1 and B1 to B3 are formed by a virtual machine monitor 34 that operates on a host operating system (OS) 35 that drives a central processing unit (CPU) of the physical server 30. Each of the NW function sections A1 and B1 to B3 is a virtual machine that virtually operates on the virtual machine monitor 34.

The virtual machine monitor 34 forms each of the NW function sections A1 and B1 to B3 using device configuration information 33 and a virtual disk image 32. When one of the NW function sections A1 and B1 to B3 operates, the virtual machine monitor 34 develops a memory state thereof on a physical memory area as a virtual memory image 31 that is independent from the others of the NW function sections A1 and B1 to B3 and the host OS 35.

The type of the CPU that forms each of the NW function sections A1 and B1 to B3, the processing speed of the CPU, information of an input/output device, and the virtual disk image 32 and the virtual memory image 31 that are to be used are described in the device configuration information 33. The virtual disk image 32 is a file that imitates the storage device, such as an HDD or the like, and stores therein data that is to be stored in the HDD or the like.

The test execution server 1 duplicates the virtual memory image 31, the virtual disk image 32, and the device configuration information 33 via the virtual machine monitor 34, and thereby, generates snapshots of the NW function sections A1 and B1 to B3. The test execution server 1 may be configured to duplicate the virtual disk image 32 and the device configuration information 33, and thereby, generate snapshots of the NW function sections A1 and B1 to B3.

The update information of the NW function sections A1 and B1 to B3 at a certain time and later may be separately stored in the virtual memory image 31 and the virtual disk image 32, and the virtual memory image 31 and the virtual disk image 32 at the certain time may be generated as snapshots while the NW function sections A1 and B1 to B3 are kept operating. A method for generating a snapshot may be determined depending on a condition for restoring the NW function sections A1 and B1 to B3 or the load of generating the snapshot but is not limited.

The test execution server 1 stores the generated snapshots, for example, in the storage device 4. The test execution server 1 reads the stored snapshots from the storage device 4 and develops the virtual memory image 31, the virtual disk image 32, the device configuration information 33, and the like, which form the snapshots, on the physical memory of the physical server 30. Thus, the NW function sections A1 and B1 to B3 may be operated from the states thereof at the point in time at which the snapshots thereof are generated.

Figure 3:
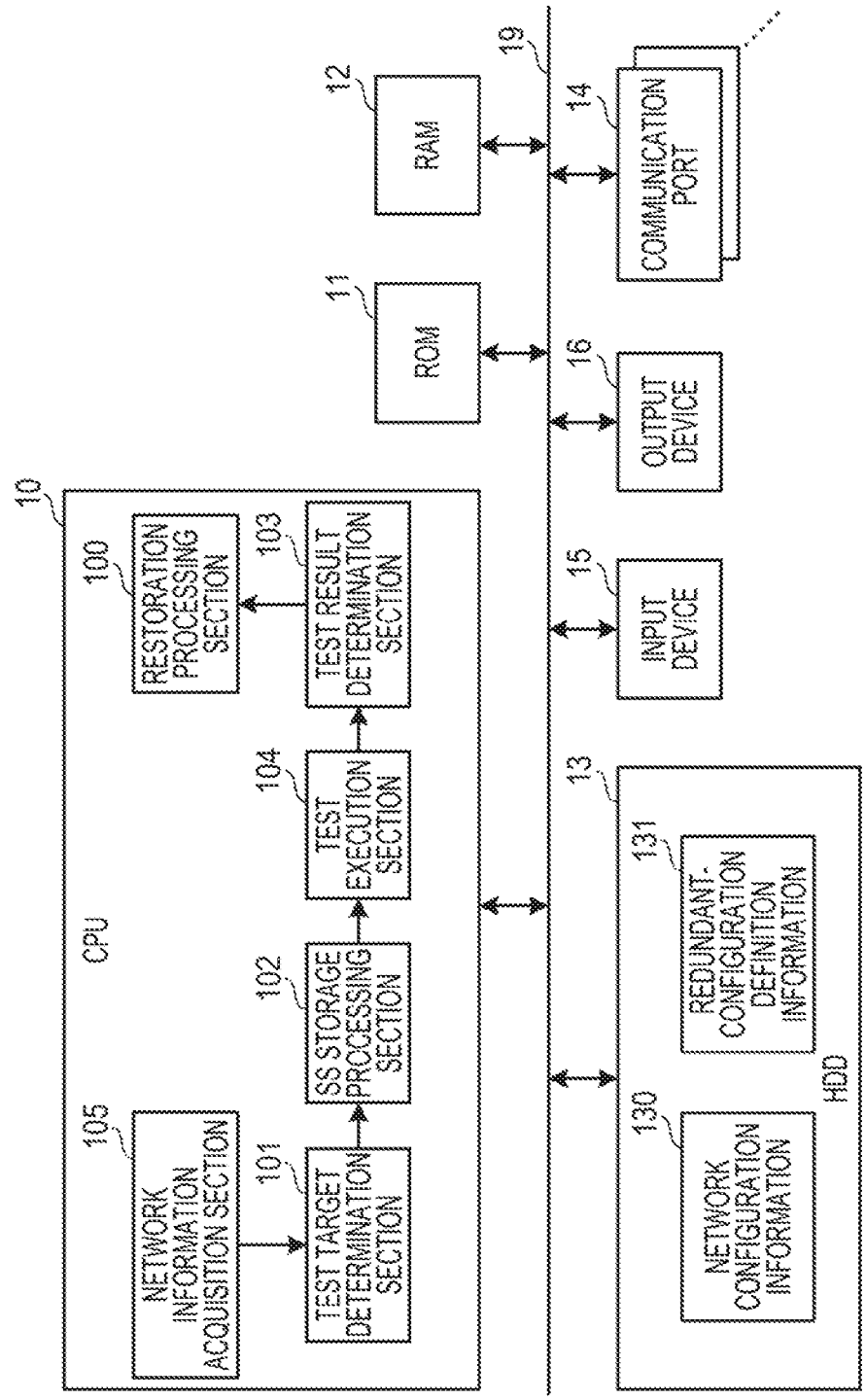
FIG. 3 is a diagram illustrating an exemplary configuration of a test execution server.

FIG. 3 is a diagram illustrating an exemplary configuration of the test execution server 1. The test execution server 1 includes a CPU 10, read-only memory (ROM) 11, random access memory (RAM) 12, an HDD 13, a plurality of communication ports 14, an input device 15, and an output device 16. The CPU 10 is coupled to the ROM 11, the RAM 12, the HDD 13, the plurality of communication ports 14, the input device 15, and the output device 16 via a bus 19 so as to input and output signals from and to each other.

A program that drives the CPU 10 is stored in the ROM 11. The RAM 12 functions as a working memory of the CPU 10. Each of the communication ports 14 is, for example, a wireless local area network (LAN) card or a network interface card (NIC) and transmits and receives a packet to and from the network management server 2 and the network 3. As a packet, an Internet protocol (IP) packet may be employed, but the packet is not limited thereto.

The input device 15 is a device that inputs information to the test execution server 1. As the input device 15, for example, a keyboard, a mouse, a touch panel, or the like may be employed. The input device 15 outputs the input information to the CPU 10 via the bus 19.

The output device 16 is a device that outputs information of the test execution server 1. As the output device 16, for example, a display, a touch panel, a printer, or the like may be employed. The output device 16 acquires information from the CPU 10 via the bus 19 and outputs the information.

When the CPU 10 reads a program from the ROM 11, a network information acquisition section 105, a test target determination section 101, a snapshot (SS) storage processing unit 102, a test execution section 104, a test result determination section 103, and a restoration processing section 100 are formed as functions. Also, network configuration information 130 and redundant-configuration definition information 131 are stored in the HDD 13. As a storage device that stores therein the network configuration information 130 and the redundant-configuration definition information 131, a non-volatile memory, such as an erasable programmable ROM (EPROM) or the like, may be used instead of the HDD 13.

The network information acquisition section 105 acquires the network configuration information 130 and the redundant-configuration definition information 131 from the network management server 2, for example, via the communication ports 14. The network configuration information 130 is information related to a configuration of the NW function sections A1, B1 to B3, C1 to C4, D1 to D3, E1, and E2 included in the network 3, and for example, includes information of connection configurations, configurations of the respective groups B to E, or the like.

The redundant-configuration definition information 131 indicates the definitions of redundant-configuration types between the NW function sections A1, B1 to B3, C1 to C4, D1 to D3, E1, and E2. More specifically, the redundant-configuration definition information 131 indicates redundant-configuration types between the groups B to E.

For example, when the test target determination section 101 is notified of the completion of acquisition of information from the network information acquisition section 105, the test target determination section 101 determines a test target NW function section from among the NW function sections A1, B1 to B3, C1 to C4, D1 to D3, E1, and E2. The test target NW function section among the NW function sections A1, B1 to B3, C1 to C4, D1 to D3, E1, and E2 may be determined at random, or may be determined in accordance with a predetermined rule. The test target determination section 101 notifies the SS storage processing section 102 of the test target NW function section among the NW function sections A1, B1 to B3, C1 to C4, D1 to D3, E1, and E2.

The SS storage processing section 102 is an example of a storage processing section and, before the test execution section 104 executes a test, the SS storage processing section 102 generates a snapshot of the test target NW function section among the NW function sections A1, B1 to B3, C1 to C4, D1 to D3, E1, and E2 and stores the snapshot in the storage device 4. More specifically, the SS storage processing section 102 accesses the virtual machine monitor 34 of the physical server 30 via the corresponding communication port 14, and thereby, reads, for example, the virtual memory image 31, the virtual disk image 32, and the device configuration information 33 to duplicate them. The SS storage processing section 102 transmits, as a snapshot, the duplicated virtual memory image 31, the duplicated virtual disk image 32, and the duplicated device configuration information 33 and causes the storage of the storage device 4 to store them.

Also, the SS storage processing section 102 may be configured to generate, in addition to the snapshot of the test target NW function section among the NW function sections A1, B1 to B3, C1 to C4, D1 to D3, E1, and E2, a snapshot of a NW function section that is influenced by the test on the test target NW function section and store the snapshot, before the test execution section 104 executes the test. In this case, the SS storage processing section 102 identifies, based on the redundant-configuration definition information 131, redundant-configuration types between the NW function sections A1, B1 to B3, C1 to C4, D1 to D3, E1, and E2 and extracts the NW function section that is influenced by the test on the test target virtual machine (test target NW function section), based on the identified redundant-configuration types.

Figure 4:
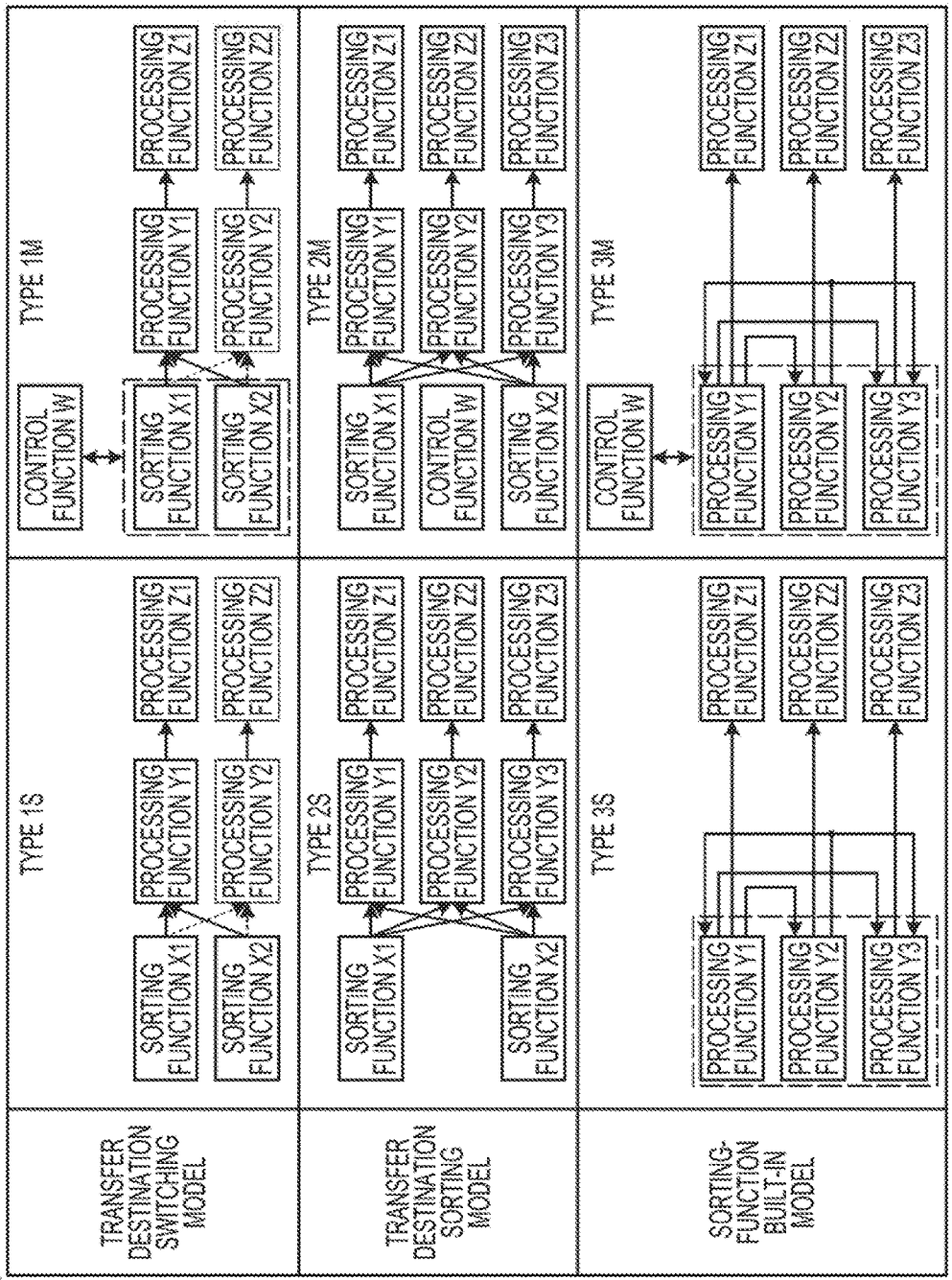
FIG. 4 is a diagram illustrating an example of redundant-configuration definition information.

In FIG. 4, an example of the redundant-configuration definition information 131 is illustrated. As for the redundant-configuration definition information 131, as an example, based on a relationship between sorting function sections (sorting functions) X1 and X2, processing function sections (processing functions) Y1 to Y3 and Z1 to Z3, and a control function section W, redundant configurations are divided into six types 1S to 3S and 1M to 3M and are thus defined. Note that there may be a case where the number of the processing function sections Y1 to Y3 and the number of the processing function sections Z1 to Z3 are not the same, and also, there may be a case where the processing function sections Y1 to Y3 and the processing function sections Z1 to Z3 are not fixedly coupled. A coupling relationship between the processing function sections Y1 to Y3 and the processing function sections Z1 to Z3 is dynamically changed, for example, by the type of the traffic Tr or a network control device.

The sorting function sections X1 and X2 sort the traffic Tr to be processed to the processing function sections Y1 to Y3 and Z1 to Z3, and the processing function sections Y1 to Y3 and Z1 to Z3 process the sorted traffic Tr. The traffic Tr is transferred, as indicated by arrows, from the sorting function sections X1 and X2 to the group of the processing function sections Y1 to Y3 and then to the group of the processing function sections Z1 to Z3 in this order.

The control function W advises a sorting destination to the sorting function sections X1 and X2 or the processing function sections Y1 to Y3 in response to an inquiry about a sorting destination to which processing of the traffic Tr is to be sorted, which is transmitted from the sorting function sections X1 and X2 and the processing function sections Y1 to Y3. Each of the types 1S to 3S and 1M to 3M will be described below.

The types 1S and 1M are classified as a transfer destination switching model. In the transfer destination switching model, the traffic Tr is transferred to only ones of the processing function sections Y1 to Y3 and Z1 to Z3, which are selected by the sorting function sections X1 and X2. In the type 1S, each of the plurality of sorting function sections X1 and X2 sorts processing of the traffic Tr to only the processing function sections Y1 and Z1 that are selected by each of the sorting function sections X1 and X2 itself. In the type 1M, each of the plurality of sorting function sections X1 and X2 sorts processing of the traffic Tr to only the processing function sections Y1 and Z1 that are the sorting destinations advised by the control function section W.

The types 2S and 2M are classified as a transfer destination sorting model. In the transfer destination sorting model, the traffic Tr is sorted to the plurality of processing function sections Y1 to Y3 and Z1 to Z3. In the type 2S, the sorting function section X1 sorts processing of the traffic Tr to each of the processing function sections Y1 to Y3 and Z1 to Z3 in accordance with predetermined control. In the type 2M, each of the plurality of sorting function sections X1 and X2 sorts processing of the traffic Tr to each of the processing function sections Y1 to Y3 and Z1 to Z3 in accordance with the sorting destinations advised by the control function section W.

The types 3S and 3M are classified as a sorting-function built-in model. In the sorting-function built-in model, the processing function sections Y1 to Y3 and Z1 to Z3 themselves are capable of sorting processing of the traffic Tr, and therefore, the sorting function sections X1 and X2 are not used. In the type 3S, the processing function section Y1 sorts processing of the traffic Tr to the other processing function sections Y2 and Y3 in the group and the processing function sections Z1 to Z3. In the type 3M, each of the plurality of processing function sections Y1 and Y2 sorts processing of the traffic Tr to the other ones of the processing function sections Y1 to Y3 in the group and the processing function sections Z1 to Z3 in accordance with the sorting destinations advised by the control function section W.

With reference to FIG. 3 again, the SS storage processing section 102 identifies the redundant-configuration types between the NW function sections A1, B1 to B3, C1 to C4, D1 to D3, E1, and E2 illustrated in FIG. 1, based on the redundant-configuration definition information 131. Processing of identifying redundant-configuration types will be described later using an example.

The SS storage processing section 102 may be configured to generate, in addition to the snapshot of the test target NW function section among the NW function sections A1, B1 to B3, C1 to C4, D1 to D3, E1, and E2, a snapshot of a NW function section that is located adjacent to the test target NW function section and store the snapshot, before the test execution section 104 executes the test. In this case, the SS storage processing section 102 extracts one of the NW function sections A1, B1 to B3, C1 to C4, D1 to D3, E1, and E2 which is located adjacent to the test target NW function section among the NW function sections A1, B1 to B3, C1 to C4, D1 to D3, E1, and E2, based on the network configuration information 130.

As long as snapshot generation processing and snapshot storage processing of the SS storage processing section 102 is performed before the execution of the test, the timings of the snapshot generation processing and the snapshot storage processing are not limited. For example, the SS storage processing section 102 may be configured to perform snapshot generation processing and snapshot storage processing at certain time intervals before the execution of the test or also may be configured to perform each processing described above in accordance with an instruction input from the input device 15 by an operator. When snapshot storage processing is completed, the SS storage processing section 102 transmits a notification of the completion of the snapshot storage processing to the test execution section 104.

The test execution section 104 is an example of an execution section and, when the test execution section 104 receives the notification from the SS storage processing section 102, the test execution section 104 executes the test on the test target virtual machine (test target NW function section) among the plurality of NW function sections A1, B1 to B3, C1 to C4, D1 to D3, E1, and E2 included in the network 3 in operation. As the test, as described above, a test (which will be hereinafter referred to as a "failure test") in which a pseudo failure is caused to occur in a test target NW function section among the NW function sections A1, B1 to B3, C1 to C4, D1 to D3, E1, and E2 or a test (which will be hereinafter referred to as a "load test") in which test traffic is input as a load to the network 3 may be employed. When the test is completed, the test execution section 104 transmits a notification of the completion of the test to the test result determination section 103.

The test result determination section 103 is an example of a determination section and, when the test result determination section 103 receives the notification from the test execution section 104, determines whether or not the test results in success, by detecting the states of the NW function sections A1, B1 to B3, C1 to C4, D1 to D3, E1, and E2. In a failure test, for example, if the traffic Tr is transferred from the NW function section A1 (start point) to the NW function section E1 or E2 (end point), the test result determination section 103 determines that the test results in success. If the traffic Tr is not transferred from the NW function section A1 to the NW function section E1 or E2, the test result determination section 103 determines that the test results in failure.

In a load test, for example, the test result determination section 103 detects a transfer rate at which the traffic Tr is transferred from the NW function section A1 (start point) to the NW function section E1 or E2 (end point). If the transfer rate is a predetermined threshold or more, the test result determination section 103 determines that the test results in success. If the transfer rate is less than the predetermined threshold, the test result determination section 103 determines that the test results in failure. The test result determination section 103 transmits a notification of the result of the test to the restoration processing section 100.

The restoration processing section 100 is an example of a replacement processing section and generates a NW function section that is a substitute for the test target NW function section among the NW function sections A1, B1 to B3, C1 to C4, D1 to D3, E1, and E2 from the snapshot stored in the SS storage processing section 102 depending on the result of the determination by the test result determination section 103. Furthermore, the restoration processing section 100 replaces the test target NW function section among the NW function sections A1, B1 to B3, C1 to C4, D1 to D3, E1, and E2 with the generated virtual machine (NW function section).

More specifically, the restoration processing section 100 generates a NW function section that is a substitute for the test target NW function section among the NW function sections A1, B1 to B3, C1 to C4, D1 to D3, E1, and E2 by reading the stored snapshot from the storage device 4 and developing the snapshot on the physical server 30 as described above.

Then, the restoration processing section 100 removes the original test target NW function section among the NW function sections A1, B1 to B3, C1 to C4, D1 to D3, E1, and E2 from the physical server 30 and replaces the original test target NW function section with the generated test target NW function section among the NW function sections A1, B1 to B3, C1 to C4, D1 to D3, E1, and E2. Note that the restoration processing section 100 may be configured to control the physical server 30 such that the original test target NW function section among the NW function sections A1, B1 to B3, C1 to C4, D1 to D3, E1, and E2 is disconnected from the network 3, instead of removing the original test target NW function section among the NW function sections A1, B1 to B3, C1 to C4, D1 to D3, E1, and E2.

The test execution server 1 implements the generated NW function section, and thereby, restarts an operation of the test target NW function section among the NW function sections A1, B1 to B3, C1 to C4, D1 to D3, E1, and E2 from the state thereof at the point in time at which the snapshot is generated. As a result, the test execution server 1 may restore the test target NW function section among the NW function sections A1, B1 to B3, C1 to C4, D1 to D3, E1, and E2 to the state thereof before the execution of the test.

Therefore, even when a potential problem occurs due to the execution of the test on the network 3, the test execution server 1 may reduce the influence of the test on the service quality. When, in addition to the snapshot of the test target NW function section among the NW function sections A1, B1 to B3, C1 to C4, D1 to D3, E1, and E2, a snapshot of another one of the NW function sections is stored, the restoration processing section 100 generates a NW function section that is a substitute for the another NW function section using a similar method to that described above.

That is, the restoration processing section 100 generates a virtual machine (NW function section) that is a substitute for a NW function section of the NW function sections A1, B1 to B3, C1 to C4, D1 to D3, E1, and E2, which may be influenced by the test from the snapshot stored by the SS storage processing section 102 and replaces the NW function section which may be influenced by the test with the generated virtual machine. Furthermore, the restoration processing section 100 may generate a virtual machine that is a substitute for a virtual machine located adjacent to the test target NW function section among the NW function sections A1, B1 to B3, C1 to C4, D1 to D3, E1, and E2 from a snapshot stored by the SS storage processing section 102 and replaces the adjacent virtual machine with the generated virtual machine.

Figure 5A:
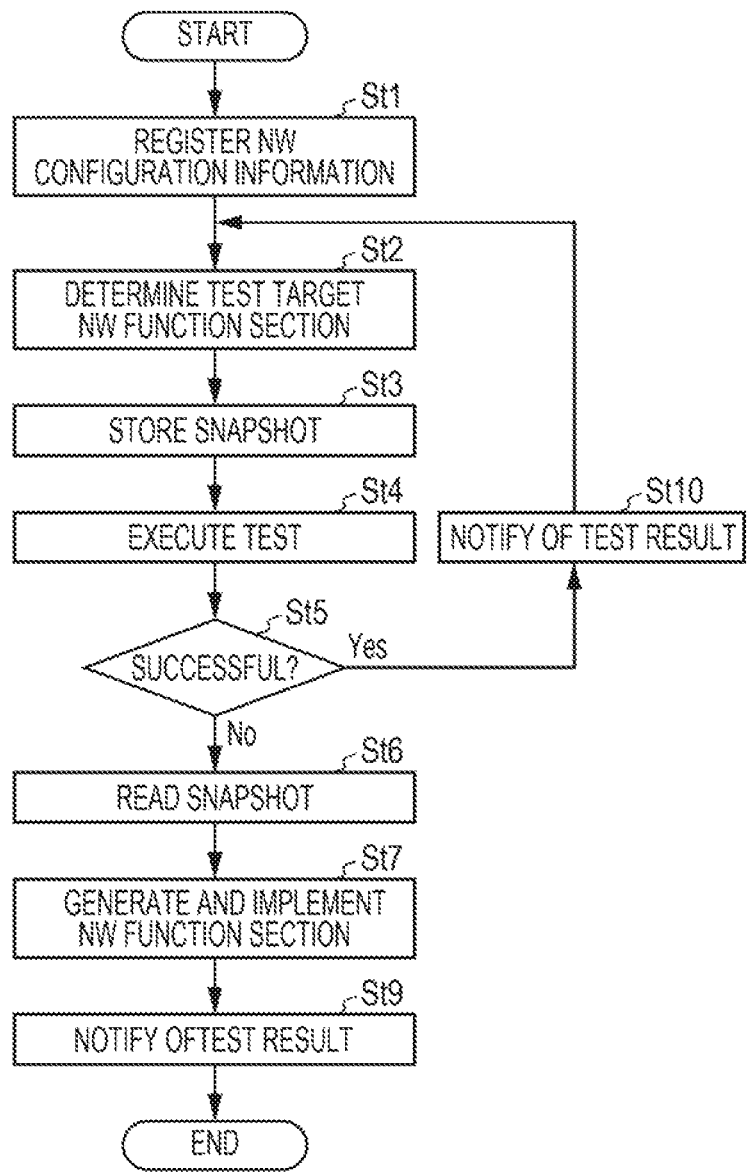
FIG. 5A is a flowchart illustrating an example of processing of a test execution server.

FIG. 5A is a flowchart illustrating an example of processing of the test execution server 1. In this example, a case where a snapshot of only a test target NW function section among the NW function sections A1, B1 to B3, C1 to C4, D1 to D3, E1, and E2 is generated will be described.

The network information acquisition section 105 acquires and registers the network configuration information 130 (SU). The network configuration information 130 may be acquired via the input device 15, or may be acquired from the network management server 2. The acquired network configuration information 130 is held in the HDD 13. Note that, as the network configuration information 130, for example, "Network Descriptor" defined by ETSI NFV ISG or "Heat Template" used in Open Stack software may be employed. ETSI NFV ISG is an abbreviation of European Telecommunication Standards Institute Network Function Virtualization Industry Specification Group.

Next, the test target determination section 101 determines, based on the network configuration information 130, a test target NW function section among the NW function sections A1, B1 to B3, C1 to C4, D1 to D3, E1, and E2 at random or in accordance with a predetermined rule (St2). For example, in a failure test, a NW function section in which a pseudo failure occurs is determined from among the NW function sections A1, B1 to B3, C1 to C4, D1 to D3, E1, and E2 and, in a load test, a NW function section to which test traffic as a load is input is determined from among the NW function sections A1, B1 to B3, C1 to C4, D1 to D3, E1, and E2. In the following example, it is assumed that the NW function section D1 is determined as a test target.

Next, the SS storage processing section 102 generates a snapshot of the test target NW function section D1 and stores the snapshot, for example, in the storage device 4 (St3). At this time, the SS storage processing section 102 accesses the virtual machine monitor 34 of the physical server 30 in which the NW function section D1 is formed and duplicates, for example, the virtual memory image 31, the virtual disk image 32, and the device configuration information 33 that correspond to the NW function section D1.

The duplicated virtual memory image 31, the duplicated virtual disk image 32, and the duplicated device configuration information 33 are stored as a snapshot. A storage destination of the snapshot is not limited to the storage device 4 and may be a storage device in the test execution server 1. As described above, as long as the snapshot is stored before the test execution section 104 executes the test, a timing of storing the snapshot is not limited.

Next, the test execution section 104 executes the test on the test target NW function section D1 (St4). For example, in a failure test, a test in which a pseudo failure is caused to occur in the NW function section D1 is executed and, in a load test, a test in which test traffic as a load is input to the NW function section D1 is executed.

Next, the test result determination section 103 determines whether or not the test results in success (St5). As described above, in a failure test, for example, if the traffic Tr is transferred from the NW function section A1 (start point) to the NW function section E1 or E2 (end point), the test result determination section 103 determines that the test results in success. If the traffic Tr is not transferred from the NW function section A1 (start point) to the NW function section E1 or E2 (end point), the test result determination section 103 determines that the test results in failure.

In a load test, for example, the test result determination section 103 detects a transfer rate at which the traffic Tr is transferred from the NW function section A1 (start point) to the NW function section E1 or E2 (end point). If the transfer rate is a threshold or more, the test result determination section 103 determines that the test results in success. If the transfer rate is less than the threshold, the test result determination section 103 determines that the test results in failure.

If it is determined that the test results in success (YES in St5), the test result determination section 103 gives notice of the result of the test to an operator of the test execution server 1 (St10). At this time, for example, the test result determination section 103 outputs information indicating that the test results in success to the output device 16. Thereafter, the processing of St2 described above is executed again.

If it is determined that the test results in failure (NO in St5), the restoration processing section 100 reads the stored snapshot from the storage device 4 (St6). Next, the restoration processing section 100 generates a NW function section D1n that is a substitute for the test target NW function section D1 from the read snapshot and implements the NW function section D1n (St7).

Figure 6:
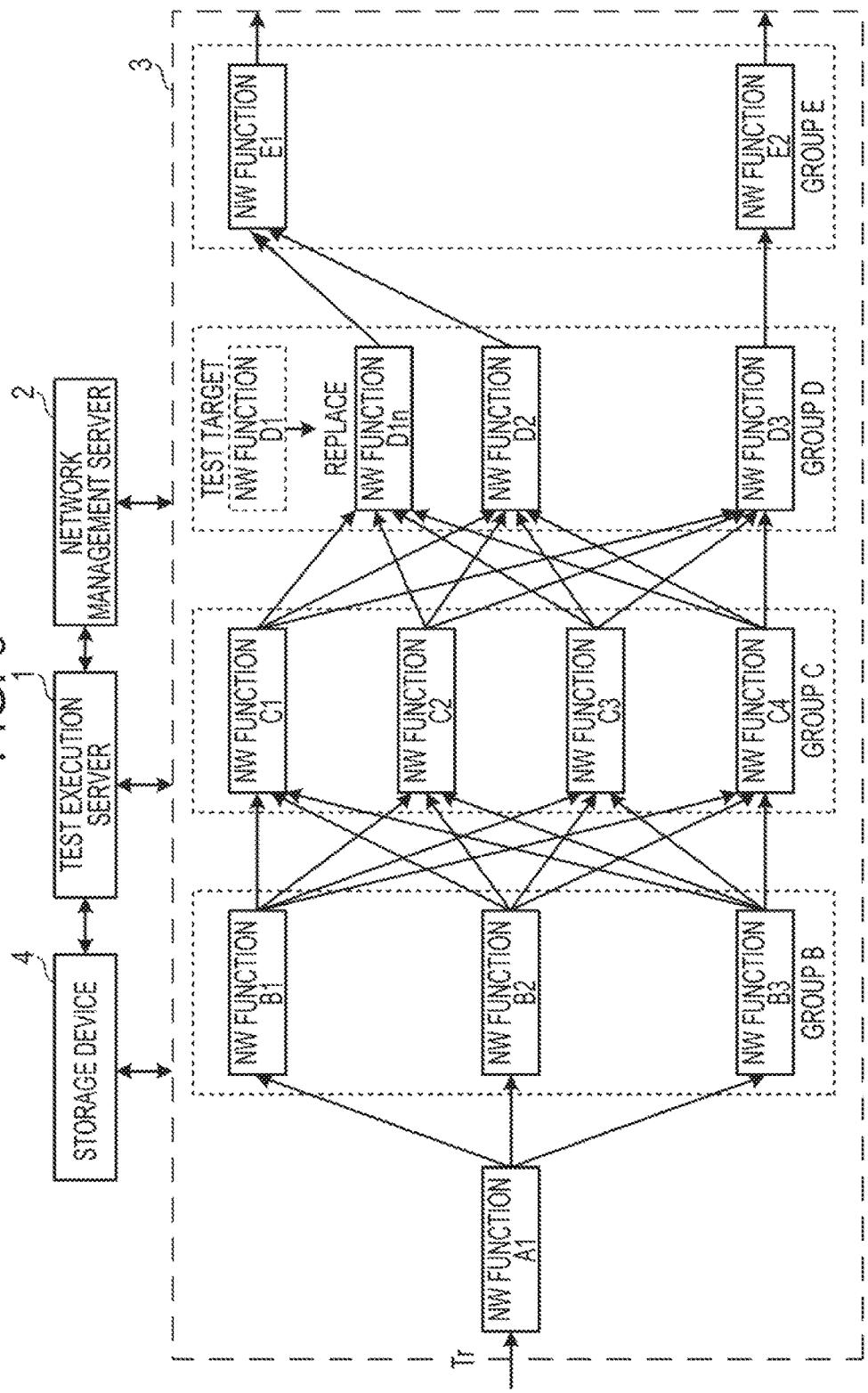
FIG. 6 is a diagram illustrating an example of replacement processing of replacing a network function section.

In FIG. 6, an example of replacement processing of replacing the NW function section D1 is illustrated. The restoration processing section 100 performs, on the virtual machine monitor 34 of the physical server 30 in which the NW function section D1 is formed, control in which the NW function section D1 is removed or control in which the NW function section D1 is disconnected from the network 3.

Also, the restoration processing section 100 controls the virtual machine monitor 34 such that the NW function section D1n that is generated from the snapshot is disposed in a similar position to the position in which the NW function section D1 is disposed in the network 3. Thus, the NW function section D1n is coupled to the other NW function sections C1 to C4 and E1 in a similar form to that of the NW function section D1. Thus, the restoration processing section 100 replaces the NW function section D1 with the substitute NW function section D1n.

The restoration processing section 100 replaces the NW function section D1 with the substitute NW function section D1n, and thereby, restarts an operation of the test target NW function section D1 from the state thereof at the point in time at which the snapshot is generated. Thus, as a result, the restoration processing section 100 may restore the test target NW function section D1 to the state thereof before the execution of the test.

Therefore, even when a potential problem occurs due to the test of the network 3, the test execution server 1 may reduce the influence of the test on the service quality.

Next, the test result determination section 103 gives notice of the result of the test including the information of the NW function section D1 to the operator of the test execution server 1 (St9). At this time, for example, the test result determination section 103 outputs the information indicating that the test results in failure to the output device 16. In this manner, the processing of the test execution server 1 is executed.

Although, in this example, after it is determined that the test results in failure (NO in St5), the test execution server 1 reads the snapshot (St6) and generates and implements the NW function section D1n (St7), the processing of the test execution server 1 is not limited thereto. As described in the following example, in order to further reduce the influence of a failure of a test on the service quality, the test execution server 1 may be configured to generate and implement the NW function section D1n in advance in case the test results in failure.

FIG. 5B is a flowchart illustrating another example of processing of the test execution server 1. In FIG. 5B, each processing in common with the FIG. 5A is denoted by a similar reference character to that in FIG. 5A and the description thereof will be omitted.

After the snapshot is stored (St3), the restoration processing section 100 reads the stored snapshot from the storage device 4 (St6). Next, the restoration processing section 100 generates the NW function section D1n that is a substitute for the test target NW function section D1 from the read snapshot and implements the NW function section D1n (St7).

Next, the test execution section 104 executes the test on the test target NW function section D1 (St4). If it is determined that the test results in success (YES in St5), the test result determination section 103 gives notice of the result of the test to the operator of the test execution server 1 (St10). Next, the restoration processing section 100 removes the NW function section D1n that is a substitute for the test target NW function section D1 (St10a). Thereafter, the processing of St2 is executed again.

If it is determined that the test results in failure (NO in St5), the restoration processing section 100 replaces the test target NW function section D1 with the NW function section D1n (St5a). More specifically, the restoration processing section 100 removes the test target NW function section D1.

Next, the test result determination section 103 gives notice of the result of the test to the operator of the test execution server 1 (St9). In this manner, the processing of the test execution server 1 is executed.

In this example, the test execution server 1 generates and implements the NW function section D1n that is a substitute for the test target NW function section D1 before the execution of the test in case the test results in failure. Thus, when the test results in failure, the test execution server 1 may quickly replace the test target NW function section D1 with the NW function section D1n. Therefore, the influence of the failure of the test on the service quality may be reduced.

In this example, unlike snapshots that are to be acquired when a failure occurs, the SS storage processing section 102 generates and stores only the snapshot of the test target NW function section D1, not the snapshots of all of the NW function sections A1, B1 to B3, C1 to C4, D1 to D3, E1, and E2 in the network 3. Thus, the storage capacity of the storage device 4 that is a storage destination in which the snapshot is stored may be reduced, and costs used for executing the test may be reduced.

Also, in this example, the time for generating a snapshot may be reduced as compared to a case where snapshots of all of the NW function sections A1, B1 to B3, C1 to C4, D1 to D3, E1, and E2 in the network 3 are generated and stored. Therefore, a time interval from the time at which the snapshot is generated to the time at which the test is executed may be reduced and a difference in the state of the NW function section D1 between the point in time at which the snapshot is generated to the point in time at which the test target NW function section D1 is restored may be reduced. Therefore, a procedure of recovering the difference in the state may be reduced.

Next, processing performed when the test execution server 1 stores, in addition to the snapshot of the test target NW function section D1, snapshots of NW function sections which are related to the NW function section D1 among the NW function sections A1, B1 to B3, C1 to C4, D2, D3, E1, and E2 will be described as an example.

FIG. 7A is a flowchart illustrating another example of processing of the test execution server 1. In FIG. 7A, each processing in common with the FIG. 5A is denoted by a similar reference character to that in FIG. 5A and the detailed description thereof will be omitted.

The network information acquisition section 105 acquires and registers the redundant-configuration definition information 131 (St1a). The redundant-configuration definition information 131 may be acquired via the input device 15, or may be acquired from the network management server 2. The acquired redundant-configuration definition information 131 is held in the HDD 13.

Next, the network information acquisition section 105 acquires and registers the network configuration information 130 (ST1). Next, the SS storage processing section 102 refers to the network configuration information 130 and the redundant-configuration definition information 131 to identify the redundant-configuration types 1S to 3S and 1M to 3M between the NW function sections A1, B1 to B3, C1 to C4, D1 to D3, E1, and E2 (St1b).

At this time, the SS storage processing section 102 identifies, based on the redundant-configuration definition information 131, redundant-configuration types between the NW function sections A1, B1 to B3, C1 to C4, D1 to D3, E1, and E2 illustrated in FIG. 1. More specifically, the SS storage processing section 102 associates each of the redundant configurations between the NW function section A1 and the groups B to E with the corresponding one of the redundant-configuration types 1S to 3S and 1M to 3M. The association is performed, for example, in accordance with information input from the input device 15 by the operator of the test execution server 1 or attribute information of the NW function sections A1, B1 to B3, C1 to C4, D1 to D3, E1, and E2. Note that, for the NW function with no redundant configuration, this processing is not performed.

In FIG. 8, exemplary identification of a redundant-configuration types is illustrated. For example, a redundant configuration between the NW function section A1 and the NW function sections B1 to B3 of the group B is identified as a redundant configuration of the type 2S and a redundant configuration between the NW function sections B1 to B3 of the group B and the NW function sections C1 to C4 of the group C is identified as a redundant configuration of the type 2M. Also, a redundant configuration between the NW function sections C1 to C4 of the group C and the NW function sections D1 and D3 of the group D is identified as a redundant configuration of the type 2M.

Note that no redundant configuration is formed between the NW function sections D1 to D3 of the group D and the NW function sections E1 and E2 of the group E, and therefore, identification of a redundant-configuration type is not performed. Also, a redundant configuration between the NW function sections E1 and E2 of the group E and a NW function section outside the network 3 is identified as a redundant configuration of the type 3M.

With reference to FIG. 7A again, the test target determination section 101 determines the test target NW function section D1 (St2). Next, based on the identified redundant-configuration types, the SS storage processing section 102 extracts, as the NW function sections that are influenced by the test on the test target NW function section D1, the other NW function sections C1 to C4, D2, and D3 included in the redundant configuration that includes the test target NW function section D1 (St2a). Next, the SS storage processing section 102 extracts the NW function section E1 located adjacent to the test target NW function section D1, based on the network configuration information 130 (St2b).

Next, the SS storage processing section 102 stores each of snapshots of the test target NW function section D1 and the NW function sections C1 to C4, D2, D3, and E1 extracted in St2a and St2b, for example, in the storage device 4 (St3a).

Figure 9:
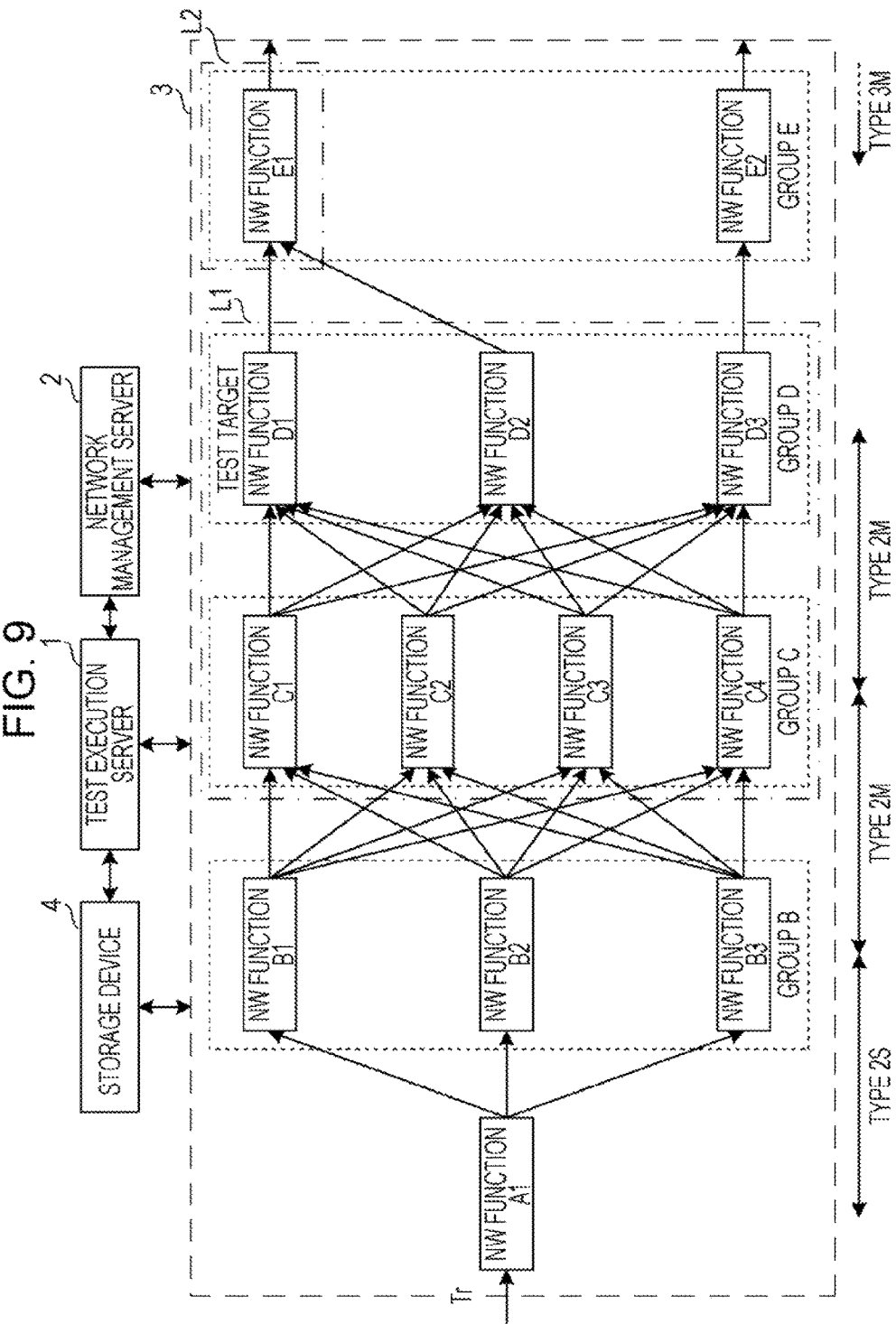
FIG. 9 is a diagram illustrating an example of a range of network function sections for which snapshots are to be generated.

In FIG. 9, an example illustrating ranges L1 and L2 of NW function sections for which snapshots are to be generated is illustrated. The SS storage processing section 102 identifies the NW function sections C1 to C4 of the group C which are redundantly configured, in the type 2M, with the NW function sections D1 to D3 included in the group D that includes the test target NW function section D1.

Thus, the SS storage processing section 102 sets the range L1 including the NW function sections C1 to C4 of the group C and the NW function sections D1 to D3 of the group D as a range for which snapshots are to be generated. In this case, the NW function sections C1 to C4 and the NW function sections D2 and D3 are extracted as NW function sections which are influenced by the test on the test target NW function section D1.

Also, the SS storage processing section 102 extracts the NW function section E1 located adjacent to the NW function section D1 as a NW function section for which a snapshot is to be generated, as indicated by the range L2.

With reference to FIG. 7A again, after determination processing of determining whether or not the test results in success (St5), the restoration processing section 100 reads each of snapshots of the NW function sections C1 to C4, D1 to D3, and E1 from the storage device 4 (St6a). Next, the restoration processing section 100 generates NW function sections C1n to C4n, D1n to D3n, and E1n that are substitutes for the NW function section C1 to C4, D1 to D3, and E1, respectively, from the read snapshots and implements the NW function sections C1n to C4n, D1n to D3n, and E1n (St7a).

In FIG. 10, an example of replacement processing of replacing the NW function sections C1 to C4, D1 to D3, and E1 is illustrated. The restoration processing section 100 replaces the NW function sections C1 to C4 and D1 to D3 in the range L1 in FIG. 9 with the NW function sections C1$n$ to C4$n$ and D1$n$ to D3$n$ generated from the snapshots. At this time, the restoration processing section 100 performs control in which the NW function sections C1 to C4 and D1 to D3 are removed or control in which the NW function sections C1 to C4 and D1 to D3 are disconnected from the network 3, on the virtual machine monitor 34 of the physical server 30 in which the NW function sections C1 to C4 and D1 to D3 are formed.

Also, the restoration processing section 100 controls the virtual machine monitor 34 such that the NW function sections C1$n$ to C4$n$ and D1$n$ to D3$n$ that are generated from the snapshots are disposed in the similar positions to the positions in which the NW function sections C1 to C4 and D1 to D3 are disposed in the network 3, respectively. Thus, the NW function sections C1$n$ to C4$n$ and D1$n$ to D3$n$ are coupled to the other NW function sections B1 to B3 and E2 in a similar form to the form in which the NW function sections C1 to C4 and D1 to D3 are coupled thereto. Also, the NW function section E1 in the range L2 is replaced with the NW function section E1$n$ similarly. In this manner, the restoration processing section 100 replaces the NW function sections C1 to C4, D1 to D3, and E1 with the substitute NW function sections C1$n$ to C4$n$, D1$n$ to D3$n$, and E1$n$.

The restoration processing section 100 replaces the NW function sections C1 to C4, D1 to D3, and E1 with the substitute NW function sections C1$n$ to C4$n$, D1$n$ to D3$n$, and E1$n$, and thereby, restarts operations of not only the test target NW function section D1 but also the other NW function sections C1 to C4, D2, D3, and E1 related to the test target NW function section D1 from the states thereof at the point in time at which the snapshots are generated. Thus, the restoration processing section 100 may restore the NW function sections C1 to C4, D2, D3, and E1 to the states thereof before the execution of the test.

Therefore, even when a potential problem occurs due to the execution of the test on the network 3, the test execution server 1 may reduce the influence of the test on the service quality. For example, between the plurality of the NW function sections C1 to C4, D2, D3, and E1 that perform path switch processing for the traffic Tr or load distribution processing in conjunction with each other, even when an error of control data or the like occurs due to the execution of the test, the NW function sections C1 to C4, D2, D3, and E1 may be restored to the states thereof before the execution of the test.

Although, in this example, after it is determined that the test results in failure (NO in St5), the test execution server 1 reads snapshots (St6$a$) and generates and implements the NW function sections C1$n$ to C4$n$, D1$n$ to D3$n$, and E1$n$ (St7$a$), the processing of the test execution server 1 is not limited thereto. Similar to the example of FIG. 5B, in order to further reduce the influence of a failure of the test on the service quality, as described in the following example, the test execution server 1 may be configured to generate and implement the NW function sections C1$n$ to C4$n$, D1$n$ to D3$n$, and E1$n$ in advance in case the test results in failure.

Figure 7B:
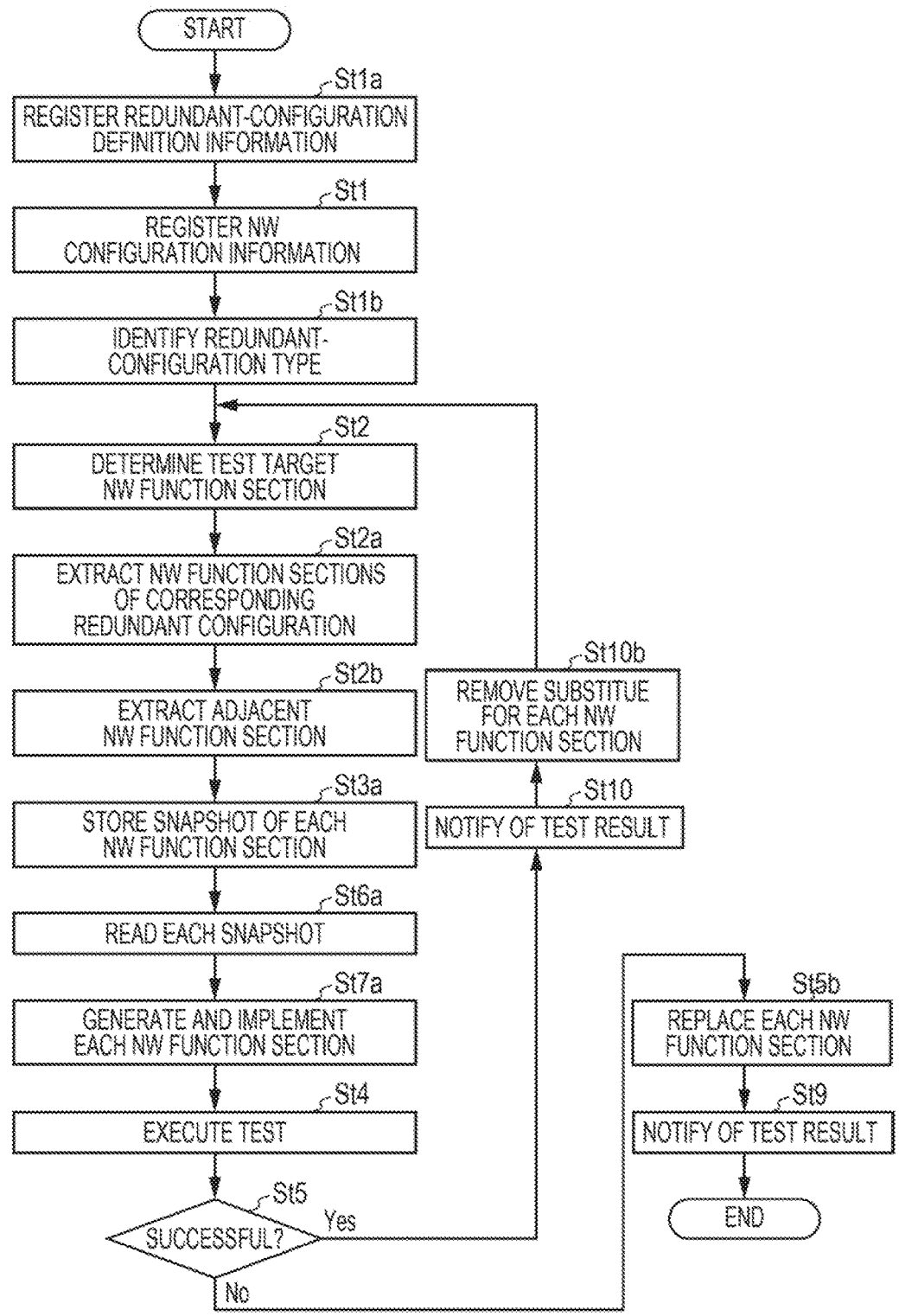
FIG. 7B is a flowchart illustrating an example of processing of a test execution server.

FIG. 7B is a flowchart illustrating another example of processing of the test execution server 1. In FIG. 7B, each processing in common with the FIG. 7A is denoted by a similar reference character to that in FIG. 7A and the description thereof will be omitted.

After the snapshots are stored (St3$a$), the restoration processing section 100 reads the stored snapshots from the storage device 4 (St6$a$). Next, the restoration processing section 100 generates the NW function sections C1$n$ to C4$n$, D1$n$ to D3$n$, and E1$n$ that are substitutes for the NW function sections C1 to C4, D1 to D3, and E1, respectively, from the read snapshots, and implements the NW function sections C1$n$ to C4$n$, D1$n$ to D3$n$, and E1$n$ (St7$a$).

Next, the test execution section 104 executes the test on the test target NW function section D1 (St4). If it is determined that the test results in success (YES in St5), the test result determination section 103 gives notice of the result of the test to the operator of the test execution server 1 (St10). Next, The restoration processing section 100 removes the NW function sections C1$n$ to C4$n$, D1$n$ to D3$n$, and E1$n$ that are substitutes for the NW function sections C1 to C4, D1 to D3, and E1, respectively (St10$b$). Thereafter, the processing of St2 is executed again.

If it is determined that the test results in failure (NO in St5), the restoration processing section 100 replaces the NW function sections C1 to C4, D1 to D3, and E1 with the NW function sections C1$n$ to C4$n$, D1$n$ to D3$n$, and E1$n$, respectively (St5$b$). More specifically, the restoration processing section 100 removes the NW function sections C1 to C4, D1 to D3, and E1.

Next, the test result determination section 103 gives notice of the result of the test to the operator of the test execution server 1 (St9). In this manner, the processing of the test execution server 1 is executed.

In this example, the test execution server 1 generates and implements the NW function sections C1$n$ to C4$n$, D1$n$ to D3$n$, and E1$n$ that are substitutes for the NW function sections C1 to C4, D1 to D3, and E1, respectively, before the execution of the test in case the test results in failure. Thus, when the test results in failure, the test execution server 1 may quickly replace the NW function sections C1 to C4, D1 to D3, and E1 with the NW function sections C1$n$ to C4$n$, D1$n$ to D3$n$, and E1$n$, respectively. Therefore, the influence of the failure of the test on the service quality may be reduced.

As described above, the test execution server 1 according to the embodiment includes the test execution section 104, the SS storage processing section 102, the test result determination section 103, and the restoration processing section 100. The test execution section 104 executes the test on the test target NW function section D1 among the plurality of the NW function sections A1, B1 to B3, C1 to C4, D1 to D3, E1, and E2 included in the network 3 in operation.

The SS storage processing section 102 generates and stores a snapshot of the test target NW function section D1 before the test execution section 104 executes the test. The test result determination section 103 determines whether or not the test results in success. Depending on the result of the determination by the test result determination section 103, the restoration processing section 100 generates the NW function section D1$n$ that is a substitute for the test target NW function section D1 from the snapshot stored in the SS storage processing section 102 and replaces the test target NW function section D1 with the generated NW function section D1$n$.

In the above-described configuration, the restoration processing section 100 generates the NW function section D1$n$ that is a substitute for the test target NW function section D1 from the snapshot and replaces the test target NW function section D1 with the generated NW function section D1$n$. Thus, the test execution server 1 implements the generated NW function section D1$n$, and thereby, restarts an operation of the test target NW function section D1 from the state thereof at the point in time at which the snapshot is generated. Thus, the test execution server 1 may restore the test target NW function section D1 to the state thereof before the execution of the test.

Therefore, even when a potential problem occurs due to the execution of a test on the network 3, the test execution server 1 may reduce the influence of the test on the service quality. Therefore, using the test execution server 1 according to the embodiment, the influence of a test on the quality of a communication service in operation may be reduced.

The network system according to the embodiment includes the plurality of NW function sections A1, B1 to B3, C1 to C4, D1 to D3, E1, and E2 included in the network 3 in operation and the test execution server 1 that executes a test on the network 3. The test execution server 1 includes the test execution section 104, the SS storage processing section 102, the test result determination section 103, and the restoration processing section 100. The test execution section 104 executes the test on the test target NW function section D1 among the plurality of the NW function sections A1, B1 to B3, C1 to C4, D1 to D3, E1, and E2 included in the network 3 in operation.

The SS storage processing section 102 generates and stores a snapshot of the test target NW function section D1 before the test execution section 104 executes the test. The test result determination section 103 determines whether or not the test results in success. Depending on the result of the determination by the test result determination section 103, the restoration processing section 100 generates the NW function section D1n that is a substitute for the test target NW function section D1 from the snapshot stored by the SS storage processing section 102 and replaces the test target NW function section D1 with the generated NW function section D1n.

The network system according to the embodiment includes a similar configuration to that of the test execution server 1 described above, and therefore, similar advantages to those described above may be achieved.

A test method according to the embodiment includes:

(1) executing a test on the test target NW function section D1 among the plurality of NW function sections A1, B1 to B3, C1 to C4, D1 to D3, E1, and E2 included in the network 3 in operation;

(2) generating and storing a snapshot of the test target NW function section D1 before the test is executed;

(3) determining whether or not the test results in success;

(4) generating, depending on the result of the determination, the NW function section D1n that is a substitute for the test target NW function section D1 from the stored snapshot; and (5) replacing the test target NW function section D1 with the generated NW function section D1n.

The test method according to the embodiment includes a similar configuration to that of the test execution server 1 described above, and therefore, similar advantages to those described above may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A test device, comprising:
a memory; and
a processor coupled to the memory and the processor configured to
execute a test on a first virtual machine among a plurality of virtual machines included in a network in operation,
generate a first snapshot of the first virtual machine before the test is executed,
generate a first substitute machine from the first snapshot, the first substitute machine being a substitute for the first virtual machine,
determine whether the test results in success,
replace the first virtual machine with the first substitute machine depending on a result of the determination,
identify a type of a redundant configuration between the plurality of virtual machines, and
extract a second virtual machine from the plurality of virtual machines on basis of the identified type, the second virtual machine being influenced by the test on the first virtual machine.

2. The test device according to claim 1, wherein
the processor is further configured to
generate a second snapshot of the second virtual machine before the test is executed,
generate a second substitute machine from the second snapshot, the second substitute machine being a substitute for the second virtual machine, and
replace the second virtual machine with the second substitute machine.

3. The test device according to claim 1, wherein
the processor is configured to
extract a second virtual machine from the plurality of virtual machines, the second virtual machine being located adjacent to the first virtual machine,
generate a second snapshot of the second virtual machine before the test is executed,
generate a second substitute machine from the second snapshot, the second substitute machine being a substitute for the second virtual machine, and
replace the second virtual machine with the second substitute machine.

4. A network system, comprising:
a network server including:
a first memory, and
a first processor coupled to the first memory and the first processor configured to implement a plurality of virtual machines included in a network; and
a test device including:
a second memory, and
a second processor coupled to the second memory and the second processor configured to
execute a test on a first virtual machine among the plurality of virtual machines included in the network in operation,
generate a first snapshot of the first virtual machine before the test is executed,
generate a first substitute machine from the first snapshot, the first substitute machine being a substitute for the first virtual machine,
determine whether the test results in success,
replace the first virtual machine with the first substitute machine depending on a result of the determination, identify a type of a redundant configuration between the plurality of virtual machines, and extract a second virtual machine from the plurality of virtual machines on basis of the identified type, the second virtual machine being influenced by the test on the first virtual machine.

5. The network system according to claim 4, wherein the second processor is further configured to generate a second snapshot of the second virtual machine before the test is executed, generate a second substitute machine from the second snapshot, the second substitute machine being a substitute for the second virtual machine, and replace the second virtual machine with the second substitute machine.

6. The network system according to claim 4, wherein the second processor is configured to extract a second virtual machine from the plurality of virtual machines, the second virtual machine being located adjacent to the first virtual machine, generate a second snapshot of the second virtual machine before the test is executed, generate a second substitute machine from the second snapshot, the second substitute machine being a substitute for the second virtual machine, and replace the second virtual machine with the second substitute machine.

7. A test method, comprising:

executing, by a computer, a test on a first virtual machine among a plurality of virtual machines included in a network in operation;

generating a first snapshot of the first virtual machine before the test is executed;

generating a first substitute machine from the first snapshot, the first substitute machine being a substitute for the first virtual machine;

determining whether the test results in success;

replacing the first virtual machine with the first substitute machine depending on a result of the determination;

identifying a type of a redundant configuration between the plurality of virtual machines; and extracting a second virtual machine from the plurality of virtual machines on basis of the identified type, the second virtual machine being influenced by the test on the first virtual machine.

8. The test method according to claim 7, further comprising:

generating a second snapshot of the second virtual machine before the test is executed;

generating a second substitute machine from the second snapshot, the second substitute machine being a substitute for the second virtual machine; and replacing the second virtual machine with the second substitute machine.

9. The test method according to claim 7, further comprising:

extracting a second virtual machine from the plurality of virtual machines, the second virtual machine being located adjacent to the first virtual machine;

generating a second snapshot of the second virtual machine before the test is executed;

generating a second substitute machine from the second snapshot, the second substitute machine being a substitute for the second virtual machine; and replacing the second virtual machine with the second substitute machine.

* * * * *